United States Patent [19]
Turner et al.

[11] Patent Number: 5,014,326
[45] Date of Patent: May 7, 1991

[54] PROJECTED IMAGE LINEWIDTH CORRECTION APPARATUS AND METHOD

[75] Inventors: James B. Turner, Menlo Park; Roderick J. McInnis, Milpitas, both of Calif.

[73] Assignee: Greyhawk Systems, Inc., Milpitas, Calif.

[21] Appl. No.: 318,736

[22] Filed: Mar. 3, 1989

[51] Int. Cl.[5] .................. G06K 9/00

[52] U.S. Cl. .................. 382/8; 382/1; 382/22; 372/26; 358/101; 350/61

[58] Field of Search .................. 332/1, 22, 25, 9, 14; 358/101, 107, 106, 96, 434, 448; 340/713; 354/5, 10; 350/6.91, 6.1, 6.5; 372/8, 21, 33, 31, 26; 250/331, 332, 333, 334; 324/198 R; 356/375, 376, 380, 384, 396, 397, 398; 364/561, 560; 346/160

[56] References Cited

U.S. PATENT DOCUMENTS 3,952,405 4/1976 Vest .................. 430/20
4,013,466 3/1977 Klaiber .................. 430/20
4,564,853 1/1986 Egan .................. 346/160
4,583,125 4/1986 Yamada .................. 382/8
4,668,982 5/1987 Tinnerino .................. 382/8
4,736,159 4/1988 Shiragasawa et al. .................. 382/8
4,810,064 3/1989 Azusama et al. .................. 350/351

*Primary Examiner*—Michael Razavi
*Attorney, Agent, or Firm*—Flehr, Hohbach, Test, Albritton & Herbert

[57] ABSTRACT

An apparatus for correcting deviations in image linewidth in a image projection system having a laser and a liquid crystal cell wherein images are made on the liquid cyrstal cell by impinging the laser on said cell. The apparatus also has apparatus for creating a test image having a plurality of lines of specific width on a liquid crystal cell and calculating the difference between the linewidth of the plurality of lines of said test image as created and as expected. Furthermore, apparatus are provided for modifying the period of the laser light based on said difference in linewidth between the plurality of lines (as created and as expected) to correct deviations in image linewidth, whereby deviations in image linewidth are substantially eliminated.

13 Claims, 3 Drawing Sheets

PROJECTED IMAGE LINEWIDTH CORRECTION APPARATUS AND METHOD

BACKGROUND OF THE INVENTION

1. Field of the Invention

The present invention relates to liquid crystal image creating systems. More specifically, the present invention relates to correction of linewidth deviations in images created in a liquid crystal by laser light.

2. Summary of the Prior Art

The present invention is applicable to any system that involves the creation of an image using laser light. A primary application of the present invention involves the laser generation of images on liquid crystal cells.

Referring to FIG. 1, a system is shown for the creation of an image on a liquid crystal display. The concept of creating an image on a liquid crystal display was first implemented at Bell Labs and is now known in the art. Generally, the process begins with creating a uniform pattern across the surface of the liquid crystal cell (a process depending on desired polarity commonly referred to as "darkening" or "brightening"). Once the surface of the liquid crystal cell 16 is made uniform an image may be created thereon. In one embodiment the image is created in an imaging computer 14. The imaging computer outputs digital signals which are sent to the laser unit 12. This digital output controls the firing of a laser which draws an image on the cell.

When the laser unit 12 is enabled a pulse of laser light is impinged upon the cell 16. The laser light creates an image by drawing a line on the cell 16. The direction of the line is controlled by a first and second galvanometer mirrors 18 and 20. Each galvanometer controls one axis. Therefore, by using two galvanometers a two dimensional image may be created. A more detailed description of the creation of an image on a liquid crystal cell is available in co-pending U.S. application Ser. No. 262,471 now abandoned.

Once the image is created on the cell 16, the image can be projected. In the formation of printed circuits a circuit board blank including a metal layer or film laminated on a suitable substrate is covered with a photosensitive layer. The cell 16 masks out light so that only certain portions of a photosensitive material or layer are exposed. The exposed photosensitive material is then removed leaving the exposed metal pattern. By etching, the exposed metal is removed, leaving the desired circuit.

When drawing a line on a liquid crystal cell using laser light the width of the line is crucial. For instance, in the printed circuit board context, if the line is too wide it may spill over into the next line and create a short circuit, or at a minimum create cross-talk. If the line is too narrow, there is a risk of a defect creating an open circuit, or having a line incapable of passing a requisite current.

The width of a line is controlled by the velocity at which the laser light passes over the cell 16 when creating the line. The slower the laser light is moving the wider the line is going to be. Conversely, the more rapidly the laser light is passed over the cell 16, the narrower the width of the generated line is going to be. Consistent with this relationship a general correlation exists between the width of the line created and the velocity at which the laser beam is swept across the surface of the cell 16. If it is desired to draw a line of 10 mils, a velocity of laser light correlative to 10 mils is selected. If it is desired to create a line of 5 mils the velocity correlative to a 5 mils wide line is selected.

Once an accurate correlation table is created for a particular image creation system, images having lines of varying width can be rapidly created. There are problems, however, in this arrangement with the creation of lines of uniform width. The four most prominent problems are (1) fluctuations in linewidth due to non-uniformities in the cell 16 itself, (2) variations in the angle of incidence of the laser light used to draw the line, (3) linewidth variation caused by the image projection system, and (4) elliptical shape of laser beam spot.

Addressing the problem of non-uniformity, over the surface of a liquid crystal cell small pockets of non-uniformity can exist. In these pockets the light gathering properties of the liquid crystal is slightly different from that of the surrounding liquid crystal. The non-uniform crystal may absorb more light than the surrounding crystal creating a wider line than desired. On the other hand, the non-uniform crystal may absorb less light than the surrounding crystal creating a narrower line than desired.

Significant variations are also caused by differences in angle of incidence of the laser light impinging on the cell. A laser light directly orthogonal to the surface of the cell 16 is going to have a different effect than light shown about the periphery of the cell 16 (at a larger angle of incidence). The greater the angle of incidence, the less intensity possessed by the laser light, but the greater the area of contact with the cell 16.

Additional linewidth variations can occur due to optical characteristics of the projection system. For example, astigmatism in the projection lens can cause differences between the widths of vertical and horizontal lines. Additionally, linewidth variation may be caused by lack of perfect circularity of the laser beam spot. For instance, if the spot is elliptical, the widest line results when the drawing motion is perpendicular to the long axis of the ellipse and the narrowest line results when the drawing motion is perpendicular to the short axis of the ellipse. These four sources of variations, and others, create differences in the linewidth as intended to be drawn and as actually drawn. As pointed out above, the effect of these variations can be quite significant.

SUMMARY OF THE INVENTION

Accordingly, it is an object of the present invention to provide a mechanism to correct linewidth deviations in a laser generated image.

It is another object of the present invention to provide a laser image generating system capable of correcting deviations in the linewidth due to non-uniformities in a liquid crystal cell.

It is another object of the present invention to provide a laser image generating system capable of correcting deviations in the linewidth due to varying angles of incidence.

It is another object of the present invention to provide a laser image generating system capable of correcting deviations in the linewidth of the projected image due to properties of the projection system.

It is another object of the present invention to provide a laser image generating system capable of correcting deviations in the linewidth due to an elliptical shape of the laser beam spot.

The attainment of these and related objects may be achieved through use of the novel linewidth correction apparatus and method herein disclosed. The linewidth correction apparatus and method in accordance with this invention has apparatus for correcting deviations in image linewidth in an image projection system having a laser and a liquid crystal cell wherein images are made on the liquid crystal cell by impinging laser light on said cell.

Also provided are apparatus for creating a test image having a plurality of lines of specific width on a liquid crystal cell and apparatus for calculating the difference between the linewidth of the plurality of lines of said test image as created and as expected. Furthermore, apparatus are provided for modifying the period of the laser light based on said calculated difference in linewidth between the plurality of lines as created and as expected to correct deviations in image linewidth, whereby deviations in image linewidth are substantially eliminated.

The attainment of the foregoing and related objects, advantages and features of the invention should be more readily apparent to those skilled in the art, after review of the following more detailed description of the invention, taken together with the drawings, in which:

DETAILED DESCRIPTION OF THE PREFERRED EMBODIMENT

The present invention comprises apparatus and method for correcting linewidth deviations in a projected image. There are many factors that may cause linewidth deviation. An example of two of those are: (1) non-uniformities in the liquid crystal cell; and (2) deviations caused by differing angles of incidence of the laser light used to draw an image on the cell. The preferred embodiment creates a coefficient of correction for each area of the cell 16 based on data collected from several points on the cell. The correction coefficient is stored in look up tables in the imaging computer 14 and used to modify the laser light impinged upon the cell for drawing purposes. The modification occurs by adjusting the length of the period of the pulsed laser light. If an area was previously determined to producer narrower lines than intended then the period of the "on" cycle of the laser light is increased. Conversely, if a narrower line was sought then the period of the "on" cycle is reduced.

Figure 1:
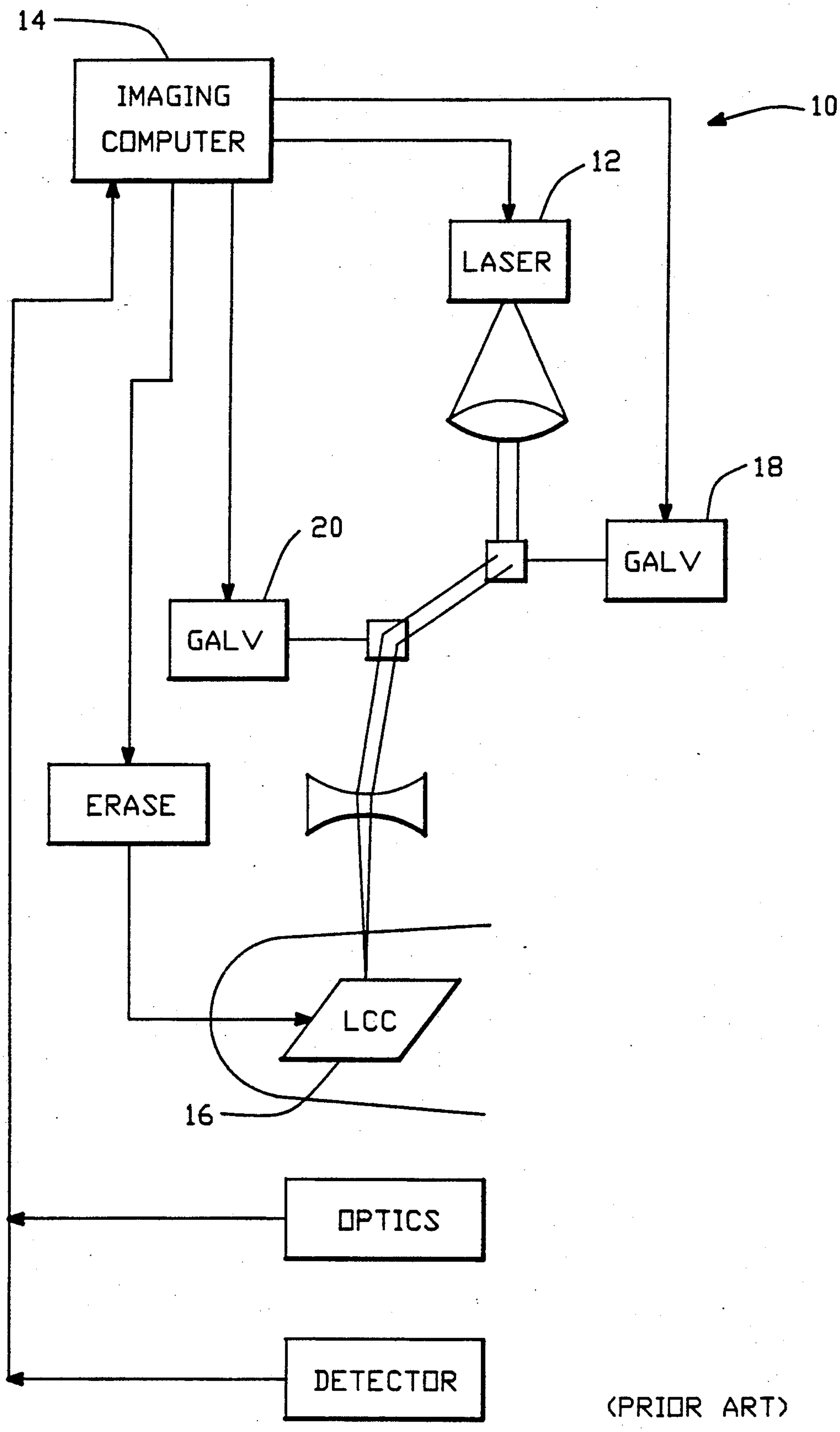
FIG. 1 is a plan view of a laser image generating system of the prior art in which the linewidth correction of the preferred embodiment may be implemented.
Figure 2:
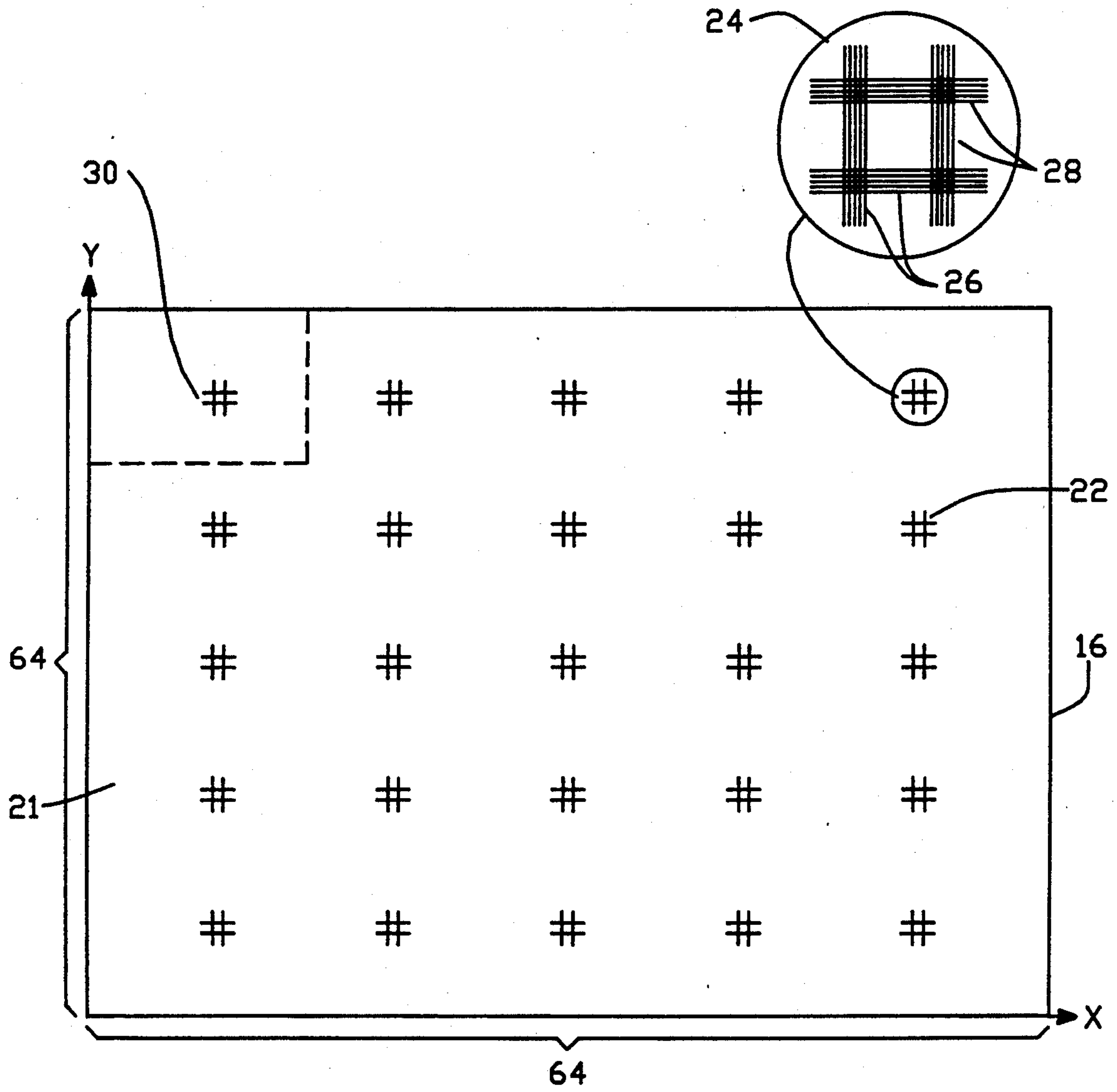
FIG. 2 represents a test pattern drawn on a liquid crystal cell in accordance with the preferred embodiment.

Referring to FIG. 2, a test image pattern is created on the liquid crystal cell 16. For analytical purposes the cell 16 is divided into 64 by 64 correction areas. Initially, however, to reduce the logistical burden created by individually calibrating such a large number of subdivisions, the surface of the cell 16 is sampled at 25 locations. The same test pattern is drawn at each location. In the preferred embodiment a test pattern similar to a number sign is used. The reason for this symbol is explained below. The number of sample points and the symbol used at each sample point is arbitrary, so long as the surface area of the cell 16 is generally represented and the symbol has components along the major and minor axes of the laser beam spots.

An expanded test pattern 24 is indicative of each test pattern 22. There are two sets of parallel lines in the vertical position and two sets of parallel lines in the horizontal position. In the preferred embodiment, the sets of parallel lines are paired off with each pair containing a set of vertical lines and a set of horizontal lines. For example, one pair of vertical and horizontal lines 26 consists of a set of parallel lines in both the vertical direction and the horizontal direction. Each of the lines in pair 26 has a width of 10 mils. Similarly the other pair of vertical and horizontal lines 28 consists of a set of parallel lines in both the vertical direction and the horizontal direction. The width of the lines in pair 28 is 5 mils.

In the discussion herein, using horizontal and vertical lines, if the laser spot is somewhat elliptical, its major and minor axes are arranged to conform with the horizontal and vertical axes. If in fact the axis of the ellipse is significantly rotated away from the horizontal, the test pattern described above should be drawn rotated by the same amount.

The test pattern is drawn by the same laser that will subsequently create images on the liquid crystal cell 16. Consistent with the relation between laser velocity and linewidth discussed above the laser beam draws a plurality of vertical and horizontal lines. The laser is moved across the cell 16 at the requisite speed to create a 5 mil line when such a line is desired. Similarly the laser is moved at the appropriate speed to create a 10 mil line when such a line is desired. Once the test pattern 21 is drawn, measurements are made of the differences between the lines as drawn and as expected. One way is to simply measure the widths of the lines as drawn and compare that to the widths expected. From this method, a ratio is obtained of the actual width of the line to the desired width of the line.

Focusing on individual test pattern 30, suppose that the measurement of the 5 mil horizontal lines was actually 5.6, and the horizontal 10 mil lines was 11. This illustrates that in the horizontal direction the lines are being made wider than desired. The purpose of using two separate linewidths is to ensure that there are no inconsistencies between them. For instance, if the 5 mil horizontal line is relatively wide, then the 10 mil horizontal line should also be relatively wide. If the 5 mil horizontal line is wider then expected and the 10 mil horizontal line is narrower then expected, then the operator is alerted that a problem exists somewhere else in the system, ie., the laser is degrading, etc. Measuring inconsistencies in proportion between the 5 and 10 mil lines is the primary purpose of drawing lines of both sizes.

Having determined that the variations in linewidth are proportional, or at least related, the primary focus is shifted to only one of the pairs 26 or 28. In the preferred embodiment, the 5 mil lines are used because they foster smaller tolerances. To fine tune the laser an average is compiled of the widths of all the lines in the test pattern. From this average the firing time of the laser 12 is adjusted. For example, if the average width of all the lines for the test pattern is 5.3, then the nominal laser firing time is adjusted down to achieve an average linewidth 5.0.

Figure 3:
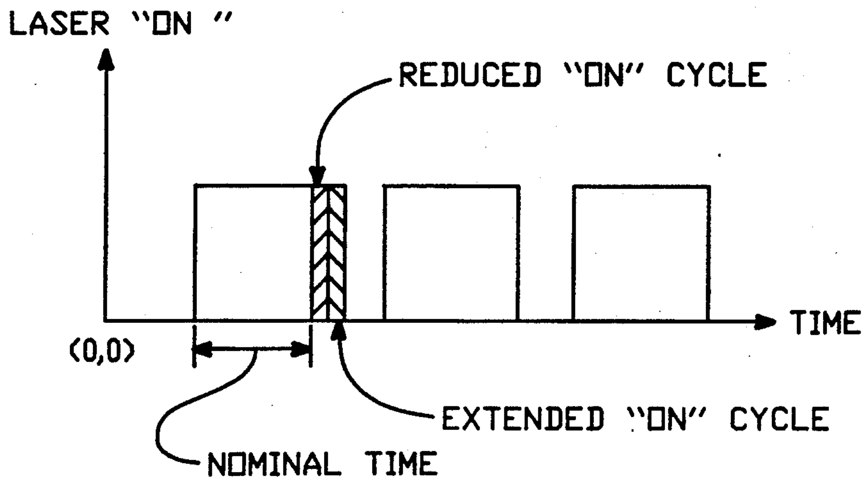
FIG. 3 is a graphical illustration of the laser firing pulse of the preferred embodiment.

There are several ways to adjust or modify the light beam to affect linewidth. As mentioned above, the velocity at which the laser passes over the surface of the cell 16 is the primary method. Additionally, the length and frequency of the laser pulse can be modified. The period of the laser light impinged on the cell 16 is modified. Referring to FIG. 3, the laser used to draw a line on the cell 16 is enabled in a rectangular wave pattern. Each unmodified "on" period is of a selected duration in length under normal, non-correction operation. When it is desired to modify the laser to compensate the linewidths, the period of each rectangular "on" cycle is modified, either increased or decreased, whichever is appropriate.

Figure 4:
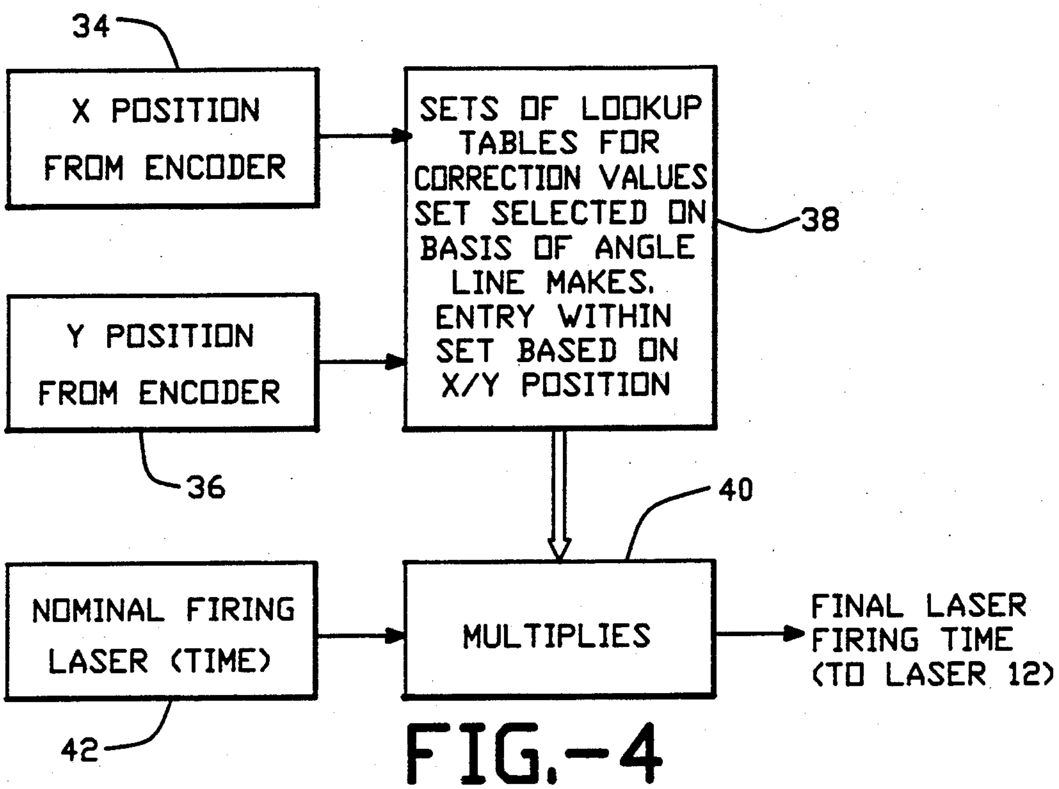
FIG. 4 is a block diagram of the linewidth correction mechanism of the preferred embodiment.

Referring to FIG. 4, a block diagram of the linewidth correction unit is shown. An "X" position encoder 34 is provided to determine where the laser beam is with respect to the x-axis. A similar "Y" position encoder 36 is provided to determine where the laser beam is with respect to the y-axis. Position encoders are known in the art. The position encoders 34 and 36 outputs are fed directly into the look up table 38 which contains the correction coefficient for each area of the cell 16. Thus, when the laser beam is in a specific x,y position, the look up table 38 provides the correction coefficient to perform linewidth correction at that particular x,y location.

The correction coefficient, generated from the previously measured difference ratio, for a particular location on the cell 16 is sent to a multiplier 40. The multiplier 40 is a standard multiplier. A suitable multiplier is made by Advanced Micro Devices (AMD) and also by Cypress Corporation. The other input to the multiplier 40 is the nominal laser firing time from the nominal laser firing time generator 42. The nominal laser firing time is the rectangular wave illustrated in FIG. 3. Adjustment for average laser firing time are made at the generator 42. In the multiplier 40, the nominal laser firing time is multiplied by the correction coefficient for the specific area of the cell where the laser is located to either increase, decrease or maintain constant the laser firing time depending on the given correction coefficient. The modified laser firing time, output from the multiplier 40, is sent to the laser 12.

The relationship of linewidth to firing time is approximately the following equation:

$$LW=a^{*}\,(LFT)^{b}$$

where:

LW=linewidth,

LFT=laser firing time, and a,b constants to be determined by curve fitting methods.

To determine corrected laser firing time the following relations are used.

LW ACT=actual linewidth

LW NOM=nominal (desired) linewidth

LFT NOM=nominal laser firing time

LFT CORR=corrected laser firing time,

Then LWACT=a* (LFT NOM)b

It is desirous to find a value for LFTCORR so that $$LW\,NOM=a^{*}\,(LFT\mathrm{CORR})^{b}.$$

Combining these equations and solving for LFT CORR we have $$LFT\_CORR=\frac{(LW\,NOM)^{1/b}}{(LW\_ACT)}\ {}^{*}\mathrm{LEFT}\_NOM.$$

A multiplicative correction must be applied to the nominal laser firing time and that multiplier is in fact the ratio of the nominal linewidth to the actual linewidth measured from the test pattern.

The firing time is the length of the rectangular "on" portion of the rectangular laser enabling wave (see FIG. 3), ie., that portion of the wave that is modified to effectuate linewidth correction.

Figure 5:
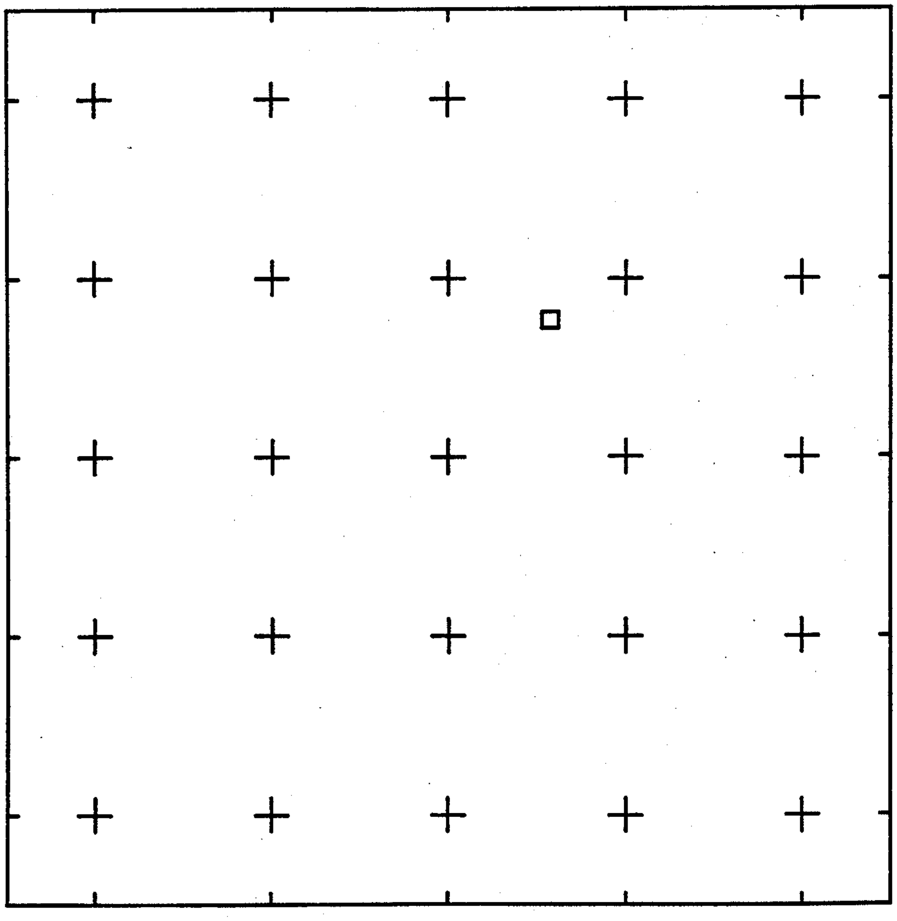
FIG. 5 illustrates the division of the liquid crystal cell for purposes of the preferred embodiment.

Referring to FIG. 5, the sample data at the 25 sample points is used to calculate correction coefficients for each of the 64×64 correction boxes. A standard linear interpolation technique is used to calculate the correction coefficient for each correction box by using correction values of the 4 neighboring sample points that surround the box of interest. Values at the sample points lying near the cell boundary are to be imagined extending to the boundary.

Referring back to FIG. 4, the x and y position encoders 34 and 36 determine which of the 4096 boxes the laser beam is impinging upon. The horizontal and vertical correction coefficients for that particular box are then sent from the look up tables 38 to the multiplier 40. If the line is being drawn horizontally, the horizontal coefficient is used. If vertical, the vertical coefficient is used. A special procedure described below, is implemented when a line is drawn at an angle between the horizontal and the vertical.

The 45 degree angle may be used as a divider to distinguish between when the horizontal or the vertical correction coefficients are going to be used. This procedure is not advisable, however, where the difference between the correction coefficients for horizontal and vertical lines is significant. Suppose for example, a vertical of 5.0 and a horizontal of 5.6. If the 45 degree angle differentiation is used in this scenario then a line drawn at 44 degrees from horizontal would have a correction coefficient for a wide (5.6) line. A similar line drawn at 46 degrees would have a correction coefficient for a normal width (5.0) line. It is a safe assumption that there is gradual variation between the amount of correction necessary at the vertical and that necessary at the horizontal, and not an abrupt difference at 45 degrees.

Accordingly, the present invention splits the 90 degree angle between vertical and horizontal into a plurality of smaller, equal sized angles. In one embodiment the 90 degrees is split into 8 angles of 12.5 degrees apiece. If the difference between the vertical and horizontal linewidth was 0.4 mils, this difference is averaged over the entire 90 degree angle. Each of the eight 12.5 degree angles has a correction coefficient correlative to a linewidth change of only 0.05 mils. Using this approach, drastic changes in correction around the 45 degree angle are eliminated. Instead several smaller, almost transparent, changes in correction take place every 12.5 degrees. The 12.5 degree delineation is generally arbitrary and alternative angle divisions may be suitable.

When a line is drawn by a laser on the cell 16, the starting and end point of the line are generated by the imaging computer 14. The imaging computer 14 then determines the angle of the line to be drawn given the beginning and ending coordinates using standard computer graphic techniques. This angle is used to select a set of correction values. If the angle is sufficiently close to the vertical or the horizontal then the correction coefficient for that particular axis is used. If it is not, then the correction coefficient for the particular angle, as interpolated down from the axes' correction coefficients, is used. The x and y position encoders 34 and 36 denote which box the laser light is in. The information from the encoders 34 and 36 is tied to the selected look up table 38 which has the correction coefficients.

If the line is drawn through more than one of the 4096 boxes, which is often the case, then the correction coefficient for each new box is used. The encoders 34 and 36 constantly keep the multiplier 40 updated with the correction coefficient appropriate to the box within which the laser is currently drawing. As above, if the line being drawn is along an axis then the axis' correction coefficient is used. If it is not, then the appropriate correction coefficient for the intermediate angle is provided through interpolation from the axis' coefficients.

It should further be apparent to those skilled in the art that various changes in form and details of the invention as shown and described may be made. It is intended that such changes be included within the spirit and scope of the claims appended hereto.

What is claimed is:

1. An apparatus for correction linewidth deviations in a projected image formed by an image projection system, comprising:

means for impinging a pulse width modulated laser on an image receiving surface to create a test image of a specific number of test points on said image receiving means, each of said test points having a plurality of lines of specific width;

means for determining the differences between the linewidth of the plurality of lines at each test point of said test image as created and a standard reference image;

means for generating a correction coefficient for each of said test points based on said determined differences;

means for interpolating said correction coefficients so that an entire area of said image receiving means is provided with a correction coefficient; and means for modifying the pulse width of said laser when said laser is impinging on a specific area of said image receiving means by the correction coefficient for said specific area means for storing said correction coefficients; and laser location positioning means connected at least to said storing means and said modifying means for indicating the position of said laser so that said storing means can transfer stored correction coefficients for a particular location to said modifying means.

2. The apparatus of claim 1 further comprising a liquid crystal cell wherein the impinging means further comprises:

means for drawing with said pulsed laser light a line pattern on said liquid crystal cell at each of a plurality of test points, said line pattern having lines with vertical and horizontal components.

3. The apparatus of claim 2 wherein the interpolating means further comprises:

means for interpolating said correction coefficients from said test points to a plurality of correction boxes.

4. The apparatus of claim 3 wherein modifying means comprises:

means for modifying laser light which is to be projected into a particular box to draw an image, by the correction coefficient created and interpolated for that particular box.

5. The apparatus of claim 4 wherein the modifying means further comprises:

multiplying means for multiplying the correction coefficient and nominal laser firing time for the pulsed laser light.

6. An apparatus for an image projecting system having a laser and a liquid crystal cell creating images on an image receiving surface, comprising:

means for impinging a pulsed width modulated laser on said image receiving surface to create a test image of a specific number of test points on said image receiving surface, each of said test points having a plurality of lines of specific width, the impinging means further include a means for creating on said liquid crystal cell a test pattern having a plurality of lines with vertical and horizontal components;

means for determining the differences between the linewidth of the plurality of lines at each test point of said test image as created and a standard reference image;

means for generating a correction coefficient for each of said test points based on said determined differences;

means for interpolating said correction coefficients so that an entire area of said image receiving surface is provided with a correction coefficient;

means for modifying the pulse width of said laser when said laser is impinging on a specific area of said image receiving surface by the correction coefficient for said specific area; and means connected to said modifying means for storing said correction coefficients so that said correction coefficients can be reused in a subsequent image created on said image receiving surface by said laser, regardless of an image content of said subsequent image.

7. The apparatus of claim 6 wherein said modifying means further comprises:

means for modifying the period of the laser light by multiplying said correction coefficients by a nominal firing time signal for said pulse width modulated laser.

8. The apparatus of claim 7 wherein the interpolating means further comprises:

means for interpolating the correction coefficients generated from the test image created on the cell to smaller subdivisions of the cell, said correction coefficients being used to modify the period of said laser light as it is projected into a particular subdivision by the correction coefficient interpolated for that particular subdivision.

9. A method of linewidth correction for an image projection system having a pulse width modulated laser and a liquid crystal cell, comprising the steps of:

drawing with said pulse width modulated laser a line pattern at each of a plurality of test points on said cell;

determining an error between the widths of lines in said line pattern as actually drawn by said laser and as intended to be drawn for each test point;

creating a correction coefficient for each test point based on said determined error;

interpolating said correction coefficients to a remainder of said cell;

storing said interpolated correction coefficients; and modifying a pulse width of said pulse width modulated laser impinged at a specific location of said cell by a specific correction coefficient for said specific location; storing said correction coefficients; and indicating the position of said laser by a laser location positioning means connected at least to said storing means and said modifying means so that said storing means can transfer stored correction coefficients for a particular location to said modifying means.

10. The method of claim 9 wherein the step of interpolating further comprises the step of:

interpolating said correction coefficient from said plurality of test points to a plurality of boxes encompassing said remainder of said cell.

11. The method of claim 10 wherein the step of modifying further comprises the step of:

modifying said pulse width of said pulse width laser impinging into a particular box by said correction coefficient created and interpolated for that particular box.

12. The method of claim 11 wherein the modifying step further comprises the step of:

modifying the pulse frequency of the laser.

13. A method of correcting deviations in image linewidth in a projected image formed by a projection system having a laser and a liquid crystal cell wherein images are made on the liquid crystal cell by impinging a pulsed laser light on said cell, comprising the steps of:

creating a test image having a plurality of lines of specific width on a liquid crystal cell;

determining the differences between the linewidth of the plurality of lines of said test image as created and as intended, the creating step further comprises the step of drawing with a laser a line pattern at each of a plurality of test points, said line pattern having lines with vertical and horizontal components;

generating pulse width correction coefficients for said laser based on said determined differences;

interpolating said correction coefficients to an entirety of said cell; and modifying the pulse width of said laser by a correction coefficient for a specific location on said cell when said laser is impinging on said specific location, whereby deviations in image linewidth are substantially eliminated.

* * * * *